United States Patent
Dean et al.

(10) Patent No.: US 9,921,952 B2
(45) Date of Patent: Mar. 20, 2018

(54) EARLY RISK IDENTIFICATION IN DEVOPS ENVIRONMENTS

(71) Applicant: International Business Machines Corporation, Armonk, NY (US)

(72) Inventors: Daniel J. Dean, Raleigh, NC (US); Andrzej Kochut, Mount Kisco, NY (US); Anca Sailer, Scarsdale, NY (US); Charles O. Schulz, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/727,960

(22) Filed: Jun. 2, 2015

(65) Prior Publication Data
US 2016/0357660 A1 Dec. 8, 2016

(51) Int. Cl.
*G06F 9/44* (2006.01)
*G06F 11/36* (2006.01)
*G06Q 10/00* (2012.01)

(52) U.S. Cl.
CPC ............ *G06F 11/3692* (2013.01); *G06F 8/00* (2013.01); *G06Q 10/00* (2013.01)

(58) Field of Classification Search
USPC ......................................................... 717/124
See application file for complete search history.

(56) References Cited

U.S. PATENT DOCUMENTS

| | | | | |
|---|---|---|---|---|
| 5,161,158 A | * | 11/1992 | Chakravarty | G06F 11/261 714/26 |
| 5,586,252 A | * | 12/1996 | Barnard | G06Q 10/10 714/48 |
| 6,219,805 B1 | | 4/2001 | Jones et al. | |
| 6,532,552 B1 | * | 3/2003 | Benignus | G06F 11/2273 714/25 |
| 6,823,478 B1 | * | 11/2004 | Prologo | G06F 11/368 714/38.14 |
| 7,035,766 B1 | * | 4/2006 | Farel | G06F 11/079 702/182 |

(Continued)

OTHER PUBLICATIONS

Crow, Failure Modes and Effects Analysis, 2014, located at http://www.npd-solutions.com/fmea.html.*

(Continued)

*Primary Examiner* — Hossain Morshed
(74) *Attorney, Agent, or Firm* — Reza Sarbakhsh

(57) ABSTRACT

A computer executes a first version of a code module in a first test environment, collects a first set of execution measurements, and creates a first profile based on the first set of execution measurements. The computer executes the first version of the code module in a second test environment, collects a second set of execution measurements, and creates a second profile based on the second set of execution measurements. In response to a difference between the first profile and the second profile exceeding a threshold, the computer provides diagnostic data characterizing the difference, analyzes an impact of the difference on the execution of the code module, calculates a risk of code module failure value based on analyzing the impact of the difference, and provides a recommended action based on analyzing the impact of the difference and the calculated risk of code module failure value.

20 Claims, 7 Drawing Sheets

(56) References Cited

U.S. PATENT DOCUMENTS

| | | | | |
|---|---|---|---|---|
| 7,039,644 | B2* | 5/2006 | Hind | G06F 11/3636 |
| 7,882,369 | B1* | 2/2011 | Kelleher | G06F 1/3203 |
| | | | | 345/419 |
| 9,256,509 | B1 | 2/2016 | Rajagopal et al. | |
| 9,349,111 | B1* | 5/2016 | Elgarat | G06F 11/36 |
| 9,740,478 | B2 | 8/2017 | Doganata et al. | |
| 2003/0056140 | A1* | 3/2003 | Taylor | G06F 11/0709 |
| | | | | 714/4.1 |
| 2004/0015317 | A1* | 1/2004 | Klotz | G06F 11/263 |
| | | | | 702/123 |
| 2004/0107415 | A1* | 6/2004 | Melamed | G06F 11/3684 |
| | | | | 717/124 |
| 2006/0155498 | A1* | 7/2006 | Dunsmore | G01R 27/28 |
| | | | | 702/107 |
| 2008/0282235 | A1* | 11/2008 | Jadhav | G06F 11/3676 |
| | | | | 717/131 |
| 2009/0138306 | A1* | 5/2009 | Coburn | G06Q 10/0635 |
| | | | | 705/7.28 |
| 2009/0282292 | A1* | 11/2009 | Squire | H04L 41/0631 |
| | | | | 714/39 |
| 2010/0191952 | A1* | 7/2010 | Keinan | G06Q 10/06 |
| | | | | 713/100 |
| 2012/0254710 | A1* | 10/2012 | Flanagan | G06Q 10/06395 |
| | | | | 715/202 |
| 2014/0156584 | A1* | 6/2014 | Motukuri | G06Q 10/06 |
| | | | | 706/52 |
| 2015/0019564 | A1* | 1/2015 | Higginson | G06F 17/3053 |
| | | | | 707/748 |
| 2015/0039386 | A1* | 2/2015 | Kymal | G06Q 10/0635 |
| | | | | 705/7.28 |
| 2015/0254172 | A1* | 9/2015 | Baril | G06F 11/3688 |
| | | | | 717/128 |
| 2015/0309918 | A1* | 10/2015 | Raghavan | G06F 11/3688 |
| | | | | 714/38.1 |

OTHER PUBLICATIONS

He, Using software dependency to bug prediction, 2013, located at https://www.hindawi.com/journals/mpe/2013/869356/.*

Chen et al., "Pinpoint: Problem Determination in Large, Dynamic Internet Services," Proceedings of the International Conference on Dependable Systems and Networks (DSN '02), IEEE Computer Society, 2002, pp. 1-10.

Desnoyers et al., "The LTTng tracer: A low impact performance and behavior monitor for GNU/Linux," Proceedings of the Linux Symposium, vol. One, Jul. 19-22, 2006, Ottawa, Ontario, Canada, pp. 209-224.

Godefroid et al., "Automated Whitebox Fuzz Testing," NDSS Symposium 2008, San Diego, CA, Feb. 8-11, 2008, pp. 1-16.

Jin et al., "Automated Concurrency-Bug Fixing," Proceedings of the 10th USENIX Symposium on Operating Systems Design and Implementation (OSDI '12), Oct. 8-10, 2012, pp. 221-236.

Traeger et al., "DARC: Dynamic Analysis of Root Causes of Latency Distributions," SIGMETRICS '08, Jun. 2-6, 2008, Annapolis, Maryland, USA, pp. 1-12.

Troester, "DevOps Success is Contingent on Shifting Left," DZone, Sep. 29, 2013, http://architects.dzone.com/articles/devops-success-contingent, Accessed on Jan. 9, 2015, pp. 1-3.

Lettrari, "Integrate model-based testing to find quality problems early in development," Apr. 5, 2011, http://www.slideshare.net/billduncan/integrate-modelbased-testing-to-fin . . . , Accessed on Jan. 6, 2015, pp. 2-20.

Cohen et al., "Capturing, Indexing, Clustering, and Retrieving System History," SOSP '05 Proceedings of the twentieth ACM symposium on Operating systems principles, Oct. 23-26, 2005, Brighton, United Kingdom, pp. 105-118.

Mell et al., "The NIST Definition of Cloud Computing," National Institute of Standards and Technology, U.S. Department of Commerce, Special Publication 800-145, pp. 1-7.

* cited by examiner

EARLY RISK IDENTIFICATION IN DEVOPS ENVIRONMENTS

BACKGROUND

The present disclosure relates generally to proactive fault location for reliability and availability and more particularly to project risk detection early in the development cycle.

DevOps (a portmanteau of "development" and "operations") is a software development method that stresses communication, collaboration, integration, automation and measurement of cooperation between software developers and other information-technology (IT) professionals.

DevOps acknowledges the interdependence of software development, quality assurance, and IT operations, and aims to help an organization rapidly produce software products and services and to improve reliability and security while providing faster development and deployment cycles.

SUMMARY

Embodiments of the present invention disclose a method, computer program product, and system in which a computer executes a first version of a code module in a first test environment, collects a first set of execution measurements, including code module execution times and code module control flows, for the first version of the code module executing in the first test environment, and creates a first profile of the first version of the code module based on the first set of execution measurements. The computer executes the first version of the code module in a second test environment, collects a second set of execution measurements, including code module execution times and control module control flows, for the first version of the code module executing in the second test environment, and creates a second profile of the first version of the code module based on the second set of execution measurements. In response to a difference between the first profile and the second profile exceeding a threshold, the computer provides diagnostic data characterizing the difference between the first profile and the second profile, analyzes an impact of the difference between the first profile and the second profile on the execution of the code module, calculates a risk of code module failure value based on analyzing the impact of the difference between the first profile and the second profile, and provides a recommended action based on analyzing the impact of the difference and the calculated risk of code module failure value.

In another aspect of the present disclosure, the computer executes a second version of the code module in the first test environment, wherein the second version of the code module is the first version of the code module with one or more code changes, collects a third set of execution measurements, including code module execution times and code module control flows, for the second version of the code module executing in the first test environment, and creates a third profile of the second version of the code module based on the third set of execution measurements. In response to a difference between the first profile and the third profile exceeding a threshold, the computer provides diagnostic data characterizing the difference between the first profile and the third profile, analyzes the impact of the difference between the first profile and the third profile on the execution of the code module, calculates a risk of code module failure value based on analyzing the impact of the difference between the first profile and the third profile, and provides a recommended action based on analyzing the impact of the difference and the calculated risk of code module failure value.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
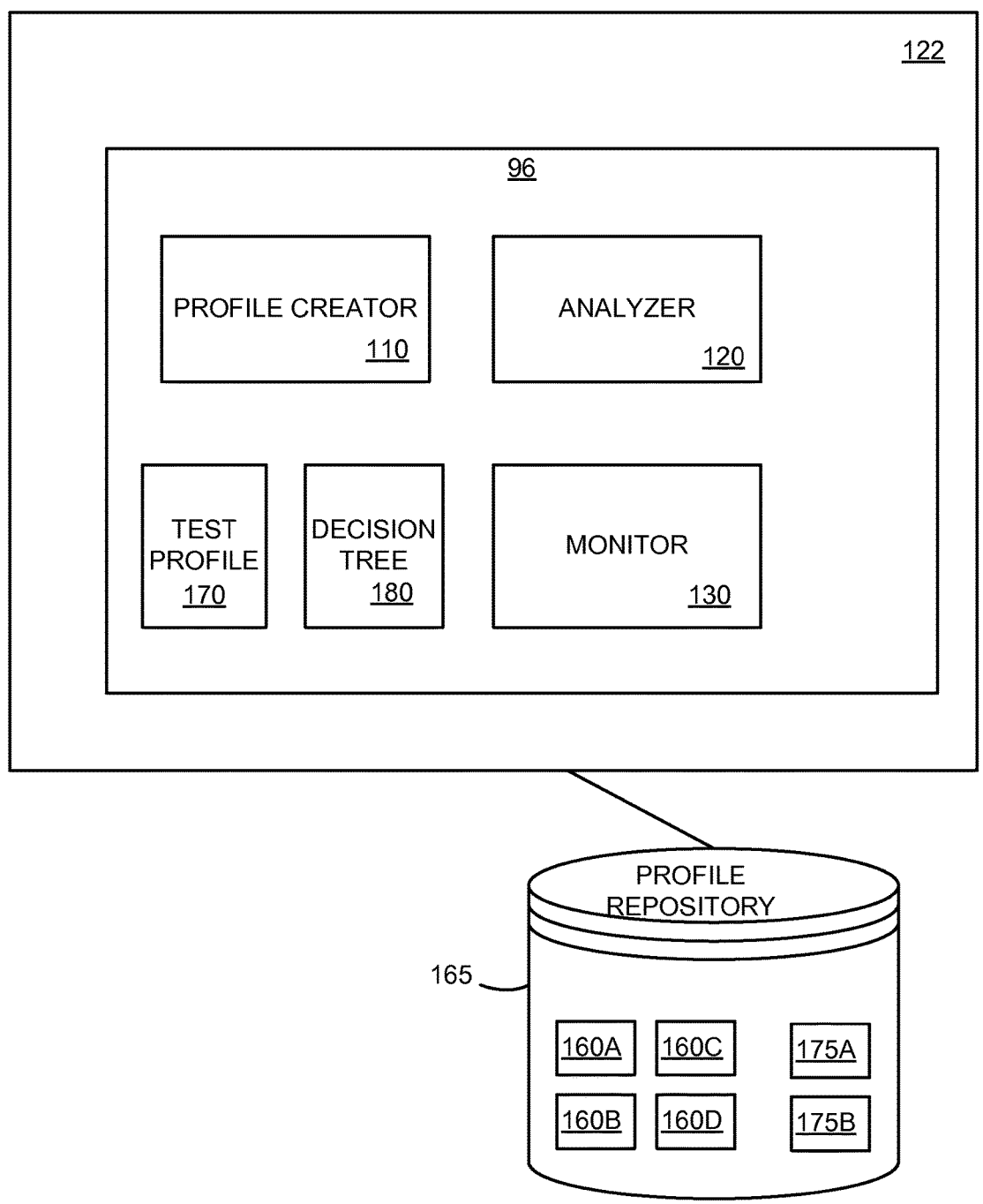
FIG. 1 illustrates a functional block diagram of an exemplary cloud computing node, in accordance with an embodiment of the present disclosure.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Various embodiments of the present disclosure identify product or application (hereinafter, "application") code changes made in a DevOps environment and, prior to deploying the changed application, provide an early assessment of risk to the reliability, availability, or performance of the changed application. Various embodiments of the present disclosure may also collect data about production level failure(s) discovered by users of the deployed application, identify the root cause(s) of the failure(s), and deploy corrective code to fix the deployed application.

Finding and fixing bugs in an application, before deployment, may be challenging in enterprise level virtualized environments where testing all possible environments may not be possible. Exemplary environmental problems may include, but are not limited to, network traffic delays or drops, and the unavailability of shared resources. In addition, a deployed application may execute on a wide variety of different systems, platforms, and architectures, each with its own characteristics and configuration specifications. Each system may utilize configuration settings, such as timeout settings for its webservers, which are specifically adapted for that system. Testing all possible systems, platforms, architectures, and environments before deployment may not be feasible, nor cost effective, but an incorrect configuration setting, an incorrect driver/module specification, or an environmental problem in the production environment may cause an application to behave differently than expected, and may cause untested code paths to execute in the deployed application.

Finding and fixing bugs in an application before deployment may also be hampered if the application is developed in a modular fashion, by a plurality of teams working in different geographies, on different systems, each team independently developing portions of the same application. The portions of the application developed by a first team may be invoked by the portions of the application, written by another team, in ways that were unanticipated by the first development team. While the invoked portion of the application code may have passed all unit testing by its development team, unanticipated interactions from other portions of the application may expose previously undetected errors that may impact the reliability, availability, or performance of the entire application. Assessing the risk of error before deployment may help DevOps managers decide whether to deploy or continue testing an application, and may minimize the impact of untested interactions, systems, platforms, architectures, etc. Any code errors missed during test or any untested, deployed code may risk performance degradation, benchmark violations, code execution failures, code input/output failures, or system failures in the user locations where the application is deployed.

Various embodiments of the present invention may use machine learning to "learn" the behavior of the application code base during pre-deployment testing by monitoring execution behaviors such as code paths taken, code execution times, etc. The learned behavior of the application may be stored in execution profiles that are used to compare the behavior of changed code against known behavior of previous levels of the application code. Changes in behavior may be analyzed to determine the risk the changed code may have on the reliability, availability, or performance of the application, if deployed.

Figure 6:
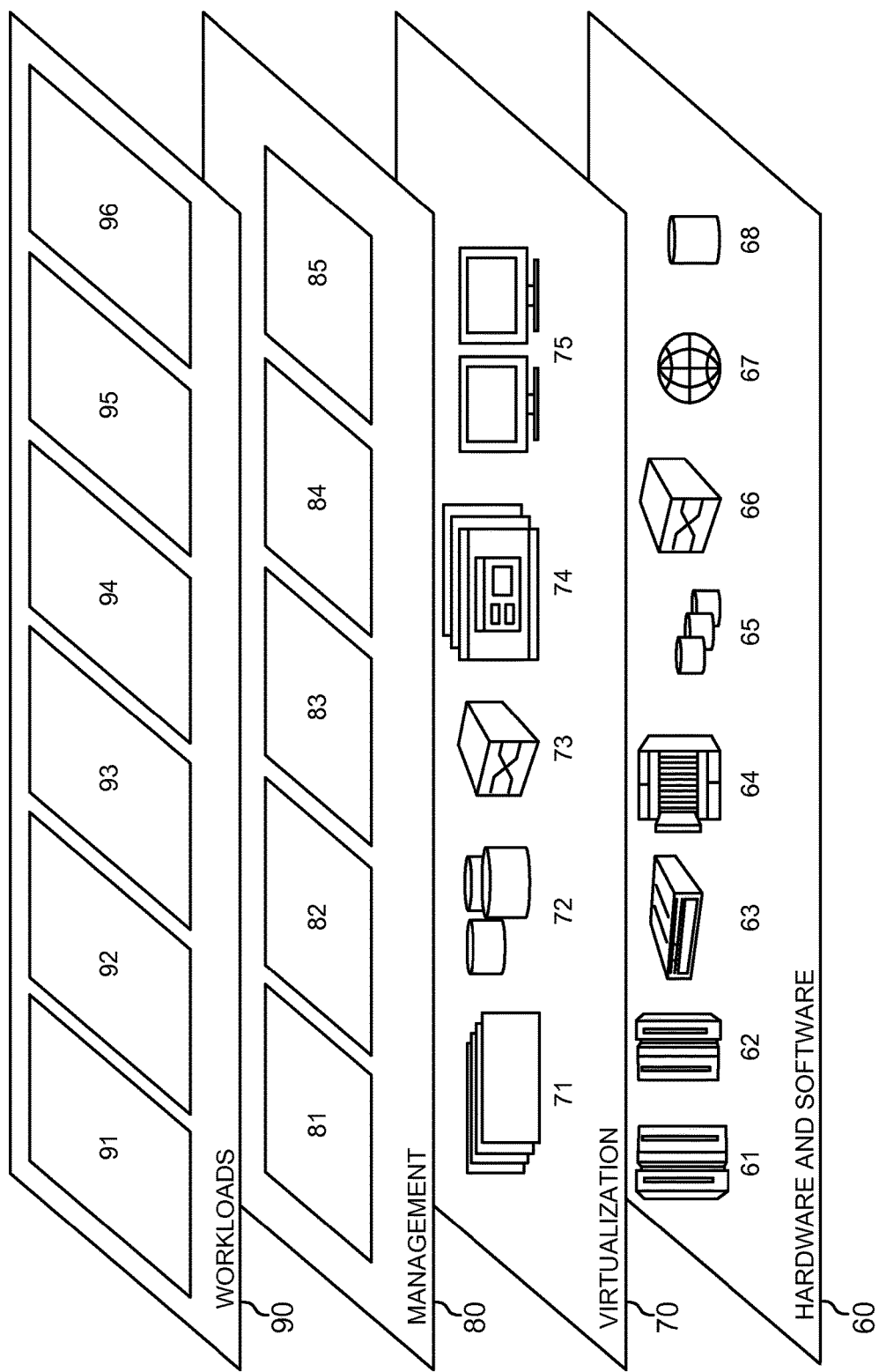
FIG. 6 depicts a block diagram of functional layers of the cloud computing environment of FIG. 5, in accordance with an embodiment of the disclosure.

FIG. 1 illustrates a functional block diagram of an exemplary cloud computing node 122, in accordance with an embodiment of the present disclosure. Cloud computing node 122 may include DevOps early risk identification 96 from the workloads 90 functional cloud environment layer (FIG. 6). DevOps early risk identification 96 may identify portions of code in an application that display signs of instability during code development and test, provide feedback to development, and calculate the risk of deploying the application without additional testing. Signs of instability, during code development, may appear as changes to the learned code behavior resulting from, among other reasons, errors in the code, test system environment variability as testing progresses through multiple test phases, or test configuration setting variability. DevOps early risk identification 96 may maintain data on some or all portions of code in the application, including impact data. Impact data may, in various embodiments, be a value rating the impact the portion of code may have on the application or on the system on which the application executes due to, for example, the number of other code portions dependent on this portion of code, and the frequency with which this portion of code is executed (execution rate). DevOps early risk identification 96 may utilize signs of instability in a portion of code, along with the maintained impact data for that portion of code, to calculate a risk value associated with deploying the application at its current level of instability. DevOps early risk identification 96 may also maintain code control flow data and build a probabilistic decision tree of all possible control flow paths to be used for diagnosing errors during development, test, and production-level failures after the application is deployed.

Figure 4:
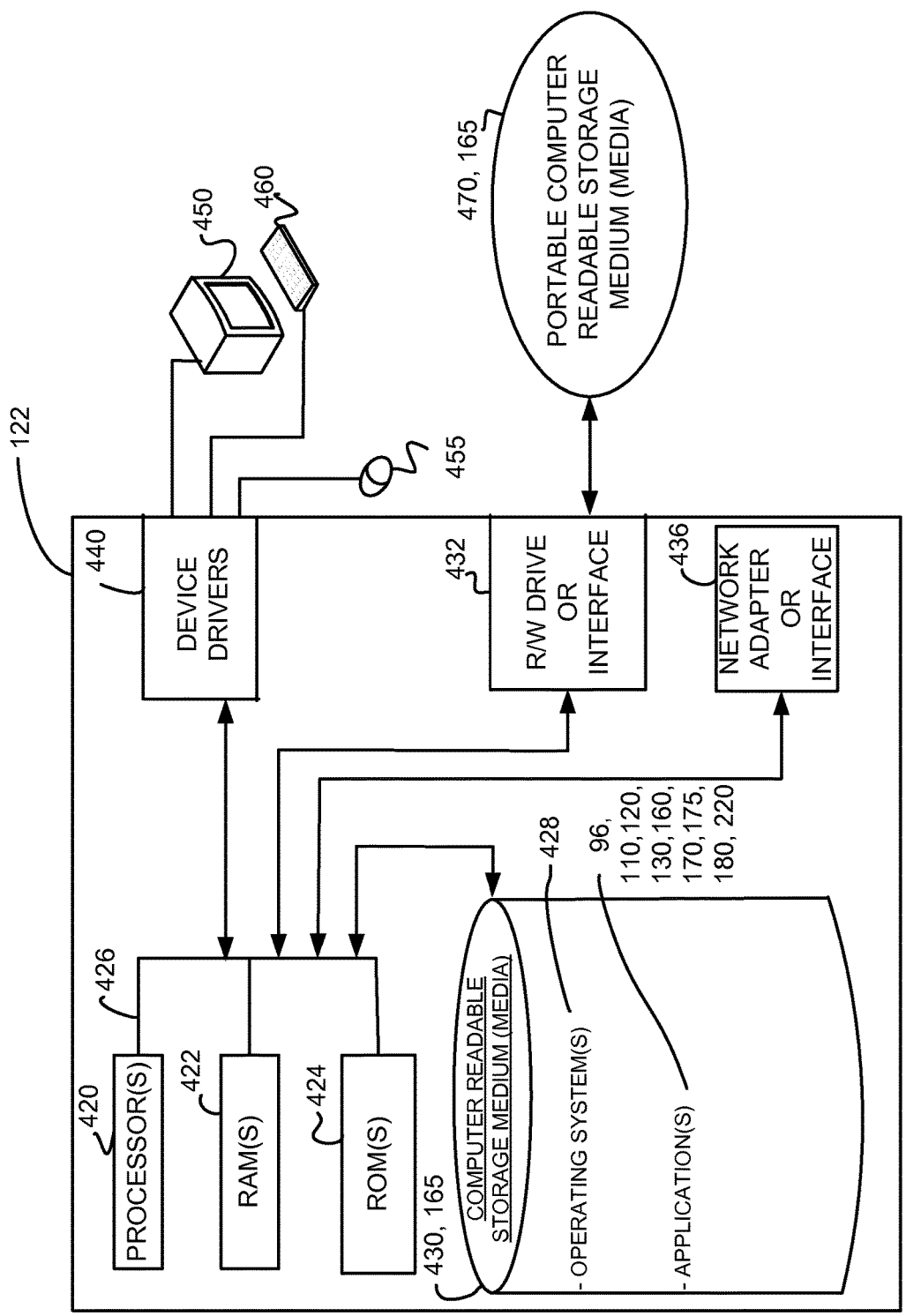
FIG. 4 depicts a block diagram of components of the computing device of FIG. 1, in accordance with an embodiment of the disclosure.

DevOps early risk identification 96 may include one or more profile creators 110, one or more risk analyzers 120, one or more monitors 130, one or more test profiles 170, one or more probabilistic decision trees 180, and one or more profile repositories 165, all of which may be stored, for example, on a computer readable storage medium, such as computer readable storage medium (media) 430 (FIG. 4), portable computer readable storage medium (media) 470, and/or RAM(S) 422. In various embodiments, profile repository 165 may be locally attached to cloud computing node 122, or may be externally accessed through a network (for example, the Internet, a local area network or other, wide area network or wireless network) and network adapter or interface 436 (FIG. 4). The network may comprise copper wires, optical fibers, wireless transmission, routers, firewalls, switches, gateway computers, and/or edge servers. In various embodiments, profile repository 165 may include one or more application execution profiles 160A, 160B, 160C, 160D, and one or more test phase baseline execution profiles 175A, 175B, for the one or more applications monitored by DevOps early risk identification 96.

In various embodiments, profile creator 110 may collect data about the application code and create an application execution profile 160 for the code by collecting entry and exit information for each portion of code in the application. Profile creator 110 may simulate a call stack for each function call and branch in the portion of code to learn the full context of the function call or branch, including, the invoker of the function or branch, parameters passed to the function or branch, conditions met for the function to be invoked or branch to be taken, and any invoked function identifiers, such as function call package name or function call thread identifier. In various embodiments, profile creator 110 may also collect code portion identifying information for the code portions being tested including, but not limited to, code portion version, and code portion developer responsible for the code portion or code changes.

At each phase of testing, such as unit test, function test, system test, performance test, integration test, etc., in the DevOps environment, profile creator 110 may collect a count of the number of times each function call or branch is invoked, along with the function call's or branch's context data, execution time, and function identification. Profile creator 110 may collect this data over multiple test runs in each test phase and over multiple test phases to create a test profile 170 covering the entire test of the application.

In various embodiments, profile creator 110 may create the test profile 170 after the first phase of testing and iteratively update the test profile 170 after each subsequent testing phase. The test profile 170, after each test phase, may include the averages of the collected data from the plurality of test runs, and may be saved in profile repository 165 as a test phase baseline execution profile 175 to be used by monitor 130 to determine the functional stability of the code. Monitor 130 will be discussed in further detail below.

The test profile 170 created after all testing phases have completed may represent the execution of all code portions of the application in the test environment, and once the application deploys, may be saved in profile repository 165 as the application execution profile 160 for the deployed version of the application. The saved execution profiles 160, 175 may be used as baselines against which future code behaviors may be compared.

In various embodiments, the created profiles 160, 170, 175 may include, but are not limited to, the identification of each function called and its code version, aggregate data that includes, but is not limited to, the average (determined from a plurality of test runs) number of invocations of each function; the average execution time of each function; the average execution time of the application; and the average number of function invocations in the application, the set of executed code branches, the set of unexecuted code branches, and the execution order of code branches and function invocations. In various embodiments, the code version included in the created profile 160, 170, 175 for each function may be used to identify the code developer of the function or code portion. In various embodiments, a plurality of application execution profiles 160A, 160B, 160C, 160D may be saved in profile repository 165 for the same application. Application execution profile 160A may, for example, represent version 1 of the deployed application while application execution profile 160B may represent version 2 of the deployed application.

In various embodiments, profile creator 110 may use the simulated call stack of the application to create a probabilistic decision tree 180 for the application. The probabilistic decision tree 180 for the application may include all possible execution path decisions in the application, and the context information associated with each execution path decision. In various embodiments, the probabilistic decision tree 180 may be stored in profile repository 165. In certain embodiments a profile 160, 170, 175 may point to its associated probabilistic decision tree 180 in the repository. In other embodiments, the probabilistic decision tree 180 may be included in the saved profile 160, 175 itself. In various embodiments, the probabilistic decision tree 180 associated with any of the saved profiles 160, 175 may be continually updated as code is added or changed for maintenance or enhancement, even though the associated version of the application and application execution profile remains unchanged.

In various embodiments, monitor 130 may utilize the data collected by profile creator 110 and stored in the created profiles 160, 170, 175 to identify tested code functions that are behaving differently than those same code functions behaved in previous versions of the code or in previous test phases. During the various phases of testing, monitor 130 may compare the data collected from the current test phase against a previously saved test phase baseline execution profile 175 for the same test phase, to determine function stability between versions, or may compare the data collected from the current test phase against a previously saved test phase baseline execution profile 175 for another test phase, to determine functional stability between test phases. Functions behaving significantly differently than expected may indicate potential coding, environmental, or configuration errors since mature code should behave relatively consistently between versions or test phases. New or changed code may be expected to behave inconsistently from previous versions and development may, in various embodiments, identify portions of code that have been dramatically changed and are, therefore, expected to behave differently in one or more test phases than the prior version of code. This expectation of different behavior may be specified by the code developer and may be included, for example, in the function identification information.

In various embodiments, monitor 130 may determine that functions, that are expected to behave consistently are, in fact, behaving inconsistently from previous versions or previous test phases by comparing the test profile 170 against a saved profile 160, 175. In various embodiments, the test profile 170 may be compared to a test phase baseline execution profile 175 for the test phase in progress. In other embodiments, the test profile 170 may be compared to the saved execution profile 160 of the previous version of the application.

In certain embodiments, monitor 130 may execute as a cloud service and monitor development test phases occurring across a plurality of machines or across a plurality of geographic locations.

In certain embodiments, monitor 130 may use statistical thresholds to identify code behaving inconsistently. For example, a statistical threshold of 95% may be established and any test profile 170 average value that is not within 95% of the baseline profile 160, 175 value may be considered as behaving inconsistently. In this example, monitor 130 may recognize that the average number of invocations of a particular function exceeds the 95% statistical threshold of the average number of invocations for that same function when compared against the test phase baseline execution profile 175 or application execution profile 160. Monitor 130 may look for inconsistent behavior, using statistical thresholds, in for example, the average number of invocations of a function, a function's average execution time, the average overall application execution time, the average count of all function invocations, the average number of unexpected paths that were executed, the average number of expected paths that were not executed, and any other collected values that may be used to signify code characteristics or behaviors. In various embodiments the statistical thresholds that signify inconsistent behavior of the code may be configurable. In certain embodiments, a single statistical threshold may apply to all profile 160, 170, 175 compared values. In other embodiments, each compared value in the profiles 160, 170, 175 may have its own statistical threshold to signify inconsistent behavior.

In certain embodiments, monitor 130 may utilize one or more statistical thresholds to cluster code function portions, for example by k-means clustering, based on the characteristics or behaviors of the code portions, such as number of invocations or execution times. Monitor 130 may use the clusters to identify any code portions whose characteristics are not consistent across multiple test runs in a single test phase. If any particular code portion's characteristics do not converge to be within the statistical threshold set, over the plurality of test runs or test phases, monitor 130 may identify those functions as behaving inconsistently.

In various embodiments utilizing k-means clustering, monitor 130 may identify a change in characteristic or behavior for a code function by recognizing the function has migrated from one k-means cluster to another k-means cluster, either between test phases or when compared against a prior version of the code portion. A code function or code portion that has migrated k-means clusters may signify a behavior change for that function that monitor 130 may use to identify functions behaving inconsistently.

In various embodiments, monitor 130, may provide feedback to development for code portions or functions that are identified as behaving differently than expected or are identified as behaving inconsistently. In various embodiments, monitor 130 may provide a ranked list of problematic code functions or code portions, enabling the developers to focus their testing efforts on those areas. Monitor 130 may also provide developers comparison data including, but not limited to, overall execution time changes, overall function invocation count changes, lists of unexpected code branches taken, and lists of new code branches taken. In various embodiments, monitor 130 may also provide potential fixes for the errors causing the inconsistent or unexpected behavior. Identifying and providing potential fixes for these errors will be discussed in further detail with reference to FIG. 2.

In various embodiments, monitor 130 may provide feedback to project managers or executives assessing the risk of deploying the application without further testing. In various embodiments, the risk may be assessed after each test phase. In other embodiments, the risk may not be assessed until the final test phase, before deployment, has completed. In various embodiments, monitor 130 may invoke risk analyzer 120, described in more detail below, to assess the risk identified code behaving inconsistently may pose to the reliability, availability, and performance of the deployed application or system on which the deployed application executes. In certain embodiments, monitor 130 may provide recommended actions, such as debug, fix, re-test, deploy as is, or stop development and enter technical debt processing. Monitor 130 may provide risk assessments and recommendations as reports, alerts to a mobile device, dashboard information, or any other communication mechanism.

In various embodiments, risk analyzer 120 may analyze the risk and make recommendations based on data collected by monitor 130 including, but not limited to, the ratio of stable to unstable functions or code portions, the number of functions changed, the identity of the stable functions, the identity of the unstable functions, execution time variations, benchmarks violated, such as service level agreements, and a weighted value of the importance of an unstable function based on the historical impact the unstable function has had on the application and the number and criticality of other functions and other products that depend on the unstable function.

In various embodiments, risk analyzer 120 may make recommendations using a classification approach. In an exemplary classification approach, risk analyzer 120 may create classes that align with the recommended actions of debug, fix, re-test, deploy as is, etc., in which each recommended action is a class. For new applications or new functions, risk analyzer 120 may place the new functions or code portions of the application into one of the recommended action classes based on the above listed data collected by monitor 130.

For changed code, risk analyzer 120 may use historical data from defect reporting tools, such as IBM® Rational®

Team Concert™ (RTC), as well the current stability of the changed code, to classify, or reclassify, the changed functions or code portions. Risk analyzer 120 may base the classification, or reclassification, at least in part, on the changed function's or changed code portion's historical reliability and historical impact on the deployed application's availability, reliability and performance. Once classified, risk analyzer 120 may use that classification to provide a recommended action. Risk analyzer 120 may also provide a risk value, based on the identified impact of any unstable functions. The risk value may identify the risk level of proceeding with the deployment of the application, function, or code fix if the recommended action is not followed. In various embodiments, the risk value may be presented as a numerical value. In other embodiments, the risk value may be presented as a level, such as low, medium, or high. In still other embodiments, the risk value may be presented as a range of colors, for example starting at green for a low risk.

DevOps early risk identification 96 may identify code instability and calculate risk of deployment for new functions, new code portions, new applications, enhanced function code changes, and error correction (or code fix) code changes. In various embodiments, DevOps early risk identification 96 may identify code instability in specific code portions, without requiring the recompile of the entire application code base. DevOps early risk identification 95 can learn and compare the characteristics and behaviors of new or changed code portions independently or in conjunction with existing unchanged code portions in the application.

Figure 2:
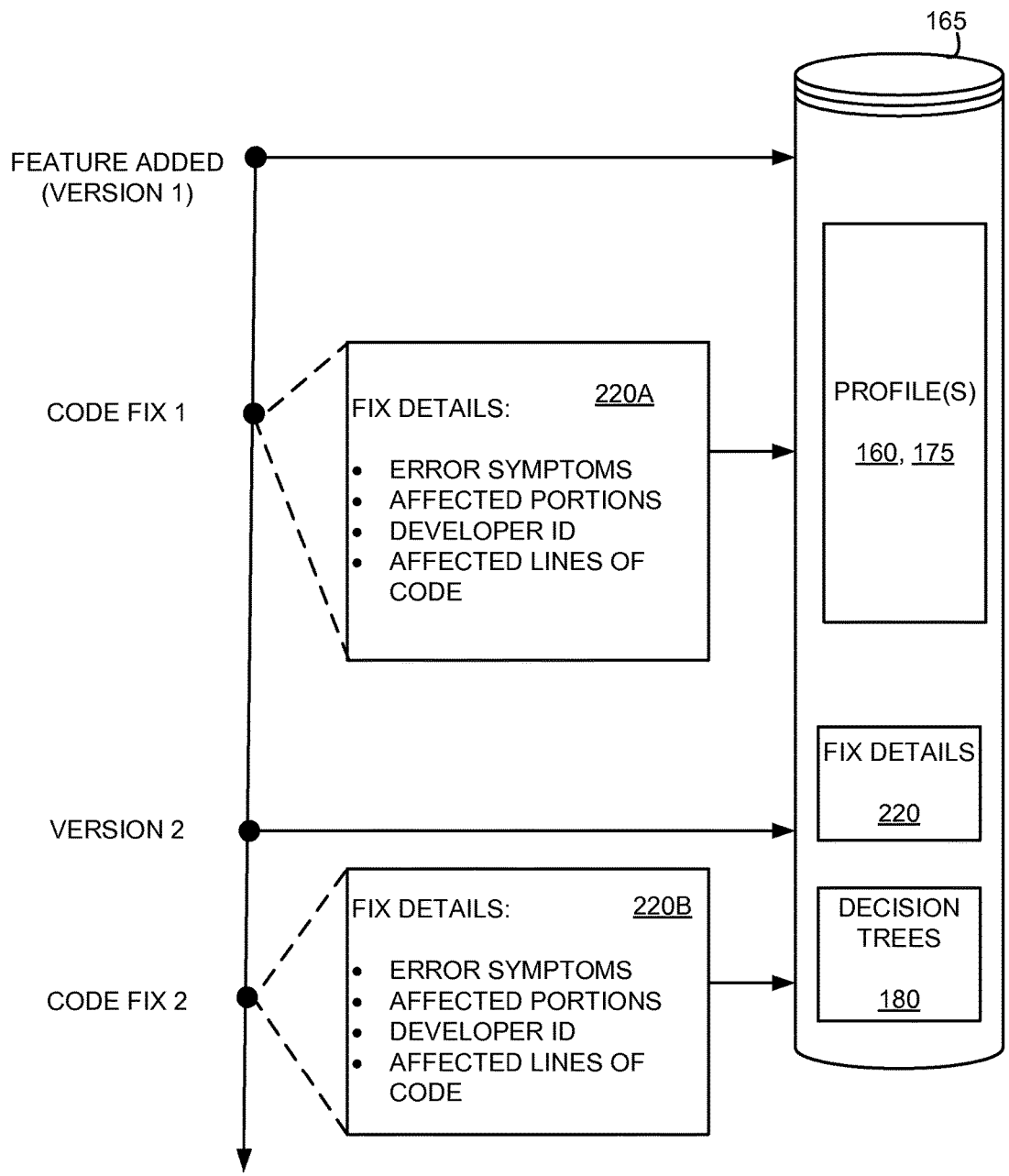
FIG. 2 depicts an exemplary code development life cycle, in accordance with an embodiment of the disclosure.

FIG. 2 depicts an exemplary code development life cycle, in accordance with an embodiment of the disclosure. In various embodiments, a revision control system may be used to develop functions, code portions, and complete applications. In various embodiments of the present disclosure, DevOps early risk identification 96 may maintain a mapping which associates a code version with one or more test phase baseline execution profiles 175 for the version, an application execution profile 160 for the version, a probabilistic decision tree 180 for the version, and known problem fix details 220A, 220B for the version.

In various embodiments, as a new feature (Version 1) is developed, profile creator 110 may add the new feature's test phase baseline execution profiles 175, application execution profile 160, and probabilistic decision tree 180 to profile repository 165 and maintain a mapping for the version (Version 1) that relates the profiles 160, 175 and probabilistic decision trees 180 to each other and to the version (Version 1) of the feature. The new feature may be a new function added to an existing application, a new code portion added to an existing application, or a new independent feature, such as an application. The feature's version information may include identification information, including the name of the code developer for the new feature.

Over time, developers may change the code with code fixes for errors discovered during the feature's test phases or discovered through production level failures in the deployed feature. Some of the errors may be discovered by monitor 130 identifying code behavior inconsistency, code behavior instability, or code failure.

In the exemplary code development life cycle, a code fix, code fix 1, has been developed for the first version of the feature. The code may have been fixed during test or may have been fixed after deployment. When exemplary code fix 1 is deployed, profile creator 110 may create exemplary fix detail 220A that includes, but is not limited to, the error symptoms of the code inconsistency, instability, or error; the code portions or functions fixed; the code developer of the fix; and the actual lines of code fixed. Profile creator 110 may map the fix details 220A to Version 1 and associate the code fix with the application execution profile 160 for Version 1. Profile creator 110 may also update the probabilistic decision tree 180 for Version 1 to reflect new/changed/deleted paths and function calls in code fix 1.

In the exemplary code development cycle, a new version (Version 2) of the feature is created, with its own profiles 160, 175, probabilistic decision tree 180 and version mapping. In various embodiments, code fix 1 may be incorporated into version 2 of the feature, so that fix details 220A is only mapped to Version 1. The next code fix, code fix 2, may fix an error that exists only in Version 2 of the feature or may fix an error that exists in both Version 1 and Version 2 of the feature. The fix details 220B may be mapped to both Version 1 and Version 2 if code fix 2 fixes an error that exists in both versions. Profile creator 110 may update all affected probabilistic decision trees 180 and profiles 160, 175 for code fix 2.

In various embodiments, monitor 130 may not only identify a problem in the code, but may use the probabilistic decision tree 180 to find the likely root cause of the problem. Monitor 130 may run the probabilistic decision tree 180 and compare the execution paths and function call contexts against the saved profiles 160, 175 to identify the code most likely to be the root cause of the error. Once a likely root cause has been identified, monitor 130 may search for an existing solution for the error. Monitor 130 may utilize the error symptoms and identified root cause code portion to search for existing solutions in, for example, the fix details 220 of known fixed problems associated with the version, historical data from defect reporting tools, such as RTC, and internet forums associated with the feature.

During test, monitor 130 may provide the found solutions for developers. After deployment, monitor 130 may execute as a cloud service, monitoring the behavior of the deployed feature in production. Monitor 130 may collect production level measurement data produced and stored by the deployed feature. Monitor 130 may utilize the monitored data to identify code behavior inconsistency, code behavior instability, production level failure(s) of the deployed feature, and identify the root cause of the problem. For these production level failures, monitor 130 may search for a known fix for the problem and may deploy the known fix to the user location.

Figure 3A:
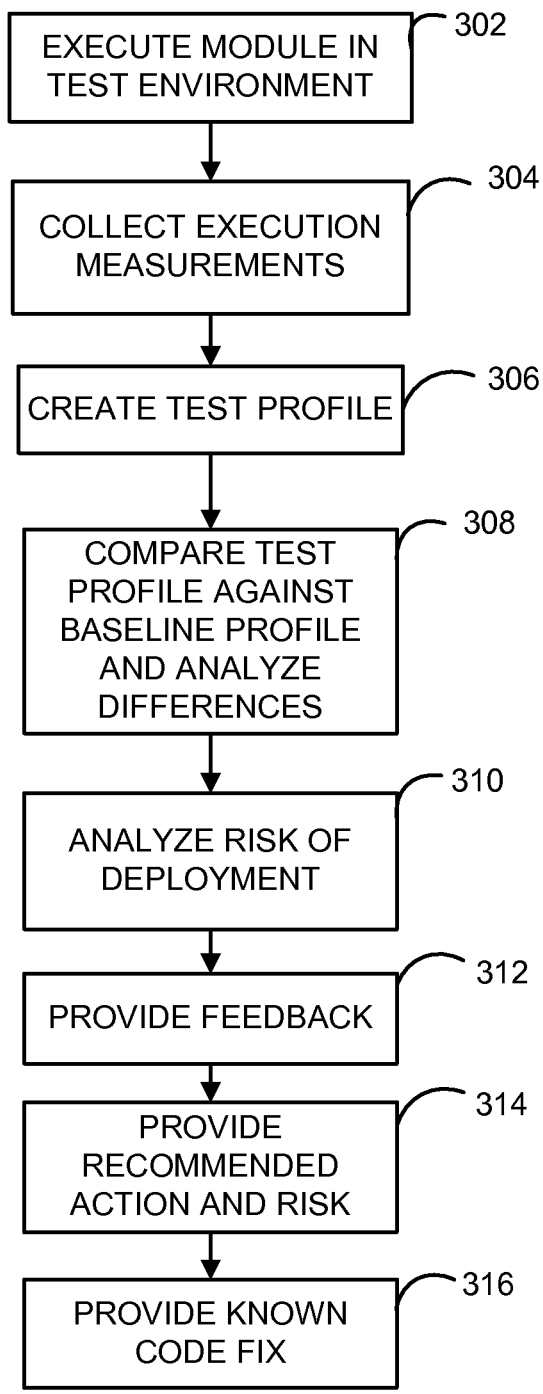
FIG. 3A is a flowchart illustrating early risk identification in a DevOps test environment, in accordance with an embodiment of the disclosure.

FIG. 3A is a flowchart illustrating early risk identification in a DevOps test environment, in accordance with an embodiment of the disclosure. In various embodiments, an exemplary code module, which may be a function, a code portion, or an entire application, may be executed in a test environment, at 302. In a DevOps environment, there may be many test environments in which the code module will be executed. In various embodiments, the same test environment may be executed more than once. Each time the exemplary code module is tested in a test environment, profile creator 110 may, at 304, collect execution measurement data. The data collected may include, code paths taken (or code module control flows) and execution times for each path taken or for the overall code module. The execution measurement data collected by profile creator 110 may also include the number of functions called and the number of times any particular function is called. Profile creator 110 may then create a test profile for the code module, at 306. If the code module has not been executed in this test environment before, profile creator 110 may create a new test profile 170, with the collected execution measurement data, for this code module in this test environment. If the code module is being retested in the same test environment, profile creator 110 may aggregate (e.g., average, maintain a minimum/maximum value, provide to a learning algorithm) the collected execution measurement data with the execution measurement data already in the test profile 170 and store the new aggregate execution measurement data in the test profile 170. In various embodiments, profile creator 110 may also collect and aggregate the collected execution measurement data with the execution measurement data already in the test profile 170 as the code module moves from one test environment to another.

For each test environment, monitor 130 may compare the test profile 170 to a baseline profile, at 308, and analyze the differences. The baseline profile may be a test phase baseline execution profile 175 saved from executing a prior version of the code module in this test environment, a test phase baseline execution profile 175 saved from executing this version of the code module in a different test environment, or may be an application execution profile 160 for a previously deployed version of this code module. If the test profile 170 matches the baseline profile 160, 175, the code module is behaving similarly to past versions of the code module. If there is a disparity, where the test profile 170 does not match the baseline profile 160, 175, monitor 130 may analyze the differences in the profiles 170, 160, 175 to create a ranked list of problematic code functions or code portions, and a set of execution measurement comparisons between the test profile 170 and the baseline profile 160, 175. Risk analyzer 120 may, at 310, utilize the collected execution measurement data and the comparison data to determine a recommended course of action based on the number and type of problematic code functions and the extent of execution measurement disparities between the test profile 170 and the baseline profiles 160, 175. Risk analyzer 120 may also, at 310, determine a risk factor of not following the recommended course of action. Risk analyzer 120 may set the risk factor based on analyzing the impact the problematic code function or code portions may have on the overall code module, if deployed as is.

Monitor 130 may, at 312, provide diagnostic data to be used by the developers of the code module that characterizes the disparity between the compared profiles 160, 170, 175, including a ranked list of problematic code functions or code portions, and execution measurement comparisons. Monitor 130 may, at 314, provide the recommended action and risk value to be used by the project managers and higher level executive to provide the tradeoffs of, for example, deploying the code module, as is, rather than performing additional testing.

In various embodiments, monitor 130 may determine the root cause of problematic code functions and may search, for example, internal service databases, historical data from defect reporting tools, or external forums for known fixes and may, at 316, provide potential code fixes to development as possible solutions to fix the problematic code functions.

Figure 3B:
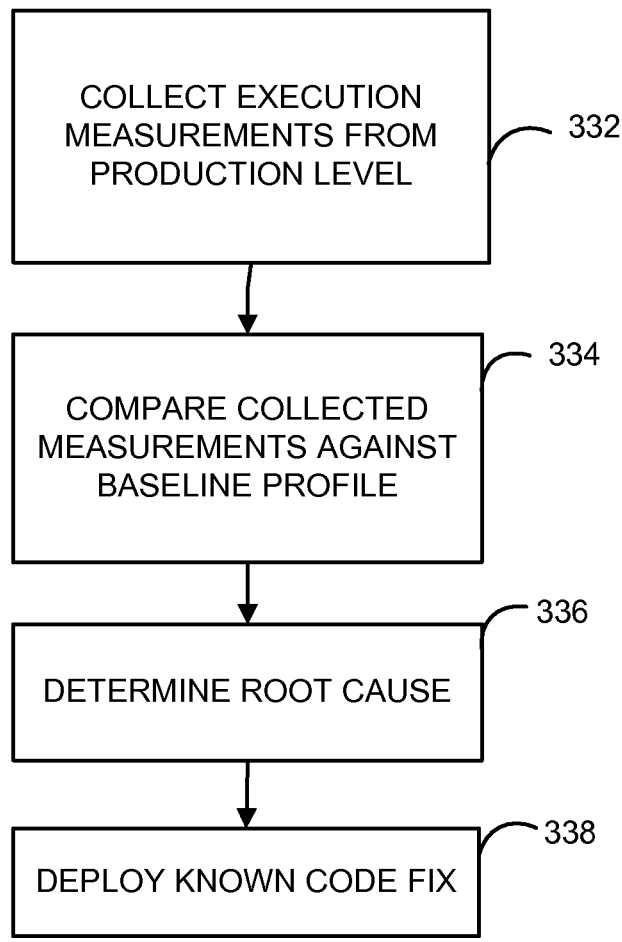
FIG. 3B is a flowchart illustrating production level error identification and repair with DevOps early risk identification executing in a cloud environment, in accordance with an embodiment of the disclosure.

FIG. 3B is a flowchart illustrating production level error identification and repair with DevOps early risk identification 96 executing in a cloud environment, in accordance with an embodiment of the disclosure. In various embodiments, monitor 130 may, at 332, collect production level execution and failure data from a deployed code module in one or more user locations. Monitor 130 may collect the data by monitoring user forums, monitoring error reporting databases, or collecting measurement data produced and stored by the deployed code module. At 334, monitor 130 may compare the collected measurements against the application execution profile 160 matching the deployed version of the code module. If the collected measurements do not match the application execution profile 160, monitor 130 may determine the root cause, at 336, of the problematic code functions found. Monitor 130 may search for a known fix in, for example, service databases including fix data 220, historical data from defect reporting tools, or forums of known fixes for the code module and may, at 338, deploy the fix to update the deployed code module in the one or more user locations experiencing the problem.

FIG. 4 depicts a block diagram of components of the computing device 122 of FIG. 1, in accordance with an embodiment of the disclosure. It should be appreciated that FIG. 4 provides only an illustration of one implementation and does not imply any limitations with regard to the environments in which different embodiments may be implemented. Many modifications to the depicted environment may be made.

Computing device 122 can include one or more processors 420, one or more computer-readable RAMs 422, one or more computer-readable ROMs 424, one or more computer readable storage medium 430, 165, device drivers 440, read/write drive or interface 432, and network adapter or interface 436, all interconnected over a communications fabric 426. Communications fabric 426 can be implemented with any architecture designed for passing data and/or control information between processors (such as microprocessors, communications and network processors, etc.), system memory, peripheral devices, and any other hardware components within a system.

One or more operating systems 428, DevOps early risk identifications 96, profile creators 110, risk analyzers 120, monitors 130, probabilistic decision trees 180, test profiles 170, profile repositories 165, application execution profiles 160, test phase execution baseline profiles 175, and fix details 220 are stored on one or more of the computer-readable storage medium 430, 165 for execution by one or more of the processors 420 via one or more of the respective RAMs 422 (which typically include cache memory). In the illustrated embodiment, each of the computer readable storage medium 430, 165 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer readable storage medium that can store a computer program and digital information.

Computing device 122 can also include a R/W drive or interface 432 to read from and write to one or more portable computer readable storage medium 470, 165. DevOps early risk identification 96, profile creator 110, risk analyzer 120, monitor 130, probabilistic decision tree 180, test profile 170, profile repository 165, application execution profile 160, test phase execution baseline profile 175, and fix details 220 can be stored on one or more of the portable computer readable storage medium 470, 165 read via the respective R/W drive or interface 432, and loaded into the respective computer readable storage medium 430, 165.

Computing device 122 can also include a network adapter or interface 436, such as a TCP/IP adapter card or wireless communication adapter (such as a 4G wireless communication adapter using OFDMA technology). DevOps early risk identification 96, profile creator 110, risk analyzer 120, monitor 130, probabilistic decision tree 180, test profile 170, profile repository 165, application execution profile 160, test phase execution baseline profile 175, and fix details 220 can be downloaded to the computing device from an external computer or external storage device via a network (for example, the Internet, a local area network or other, wide area network or wireless network) and network adapter or interface 436. From the network adapter or interface 436, the programs are loaded into the computer readable storage medium 430, 165. The network may comprise copper wires, optical fibers, wireless transmission, routers, firewalls, switches, gateway computers, and/or edge servers.

Computing device 122 can also include a display screen 450, a keyboard or keypad 460, and a computer mouse or touchpad 455. Device drivers 440 interface to display screen 450 for imaging, to keyboard or keypad 460, to computer mouse or touchpad 455, and/or to display screen 450 for pressure sensing of alphanumeric character entry and user selections. The device drivers 440, R/W drive or interface 432, and network adapter or interface 436 can comprise hardware and software (stored in computer readable storage medium 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 5:
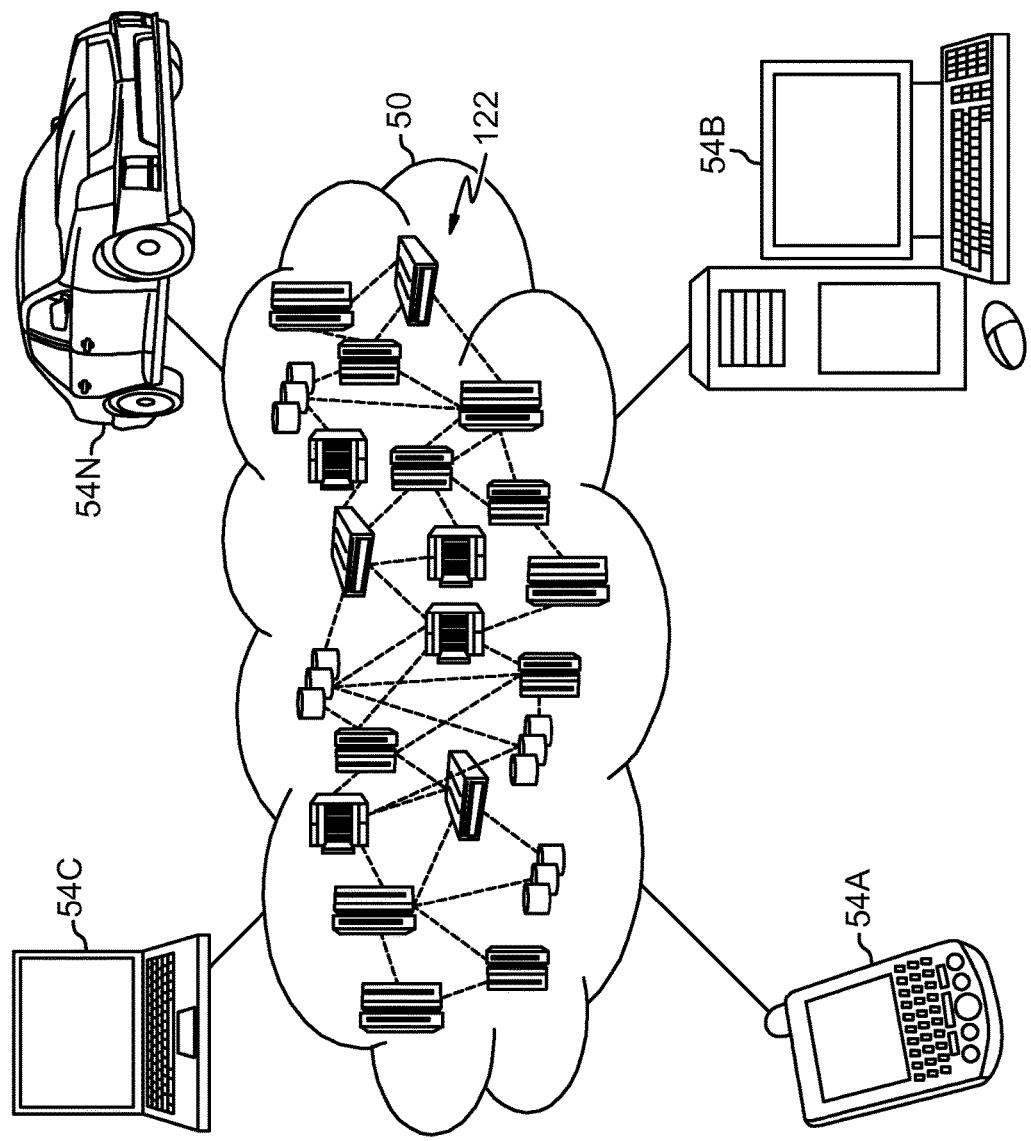
FIG. 5 depicts a cloud computing environment including the computing device of FIGS. 1 and 4, in accordance with an embodiment of the disclosure.

FIG. 5 depicts a cloud computing environment 50 including the computing device 122 of FIGS. 1 and 4, in accordance with an embodiment of the disclosure. As shown, cloud computing environment 50 comprises one or more cloud computing nodes 122 with which local computing devices used by cloud consumers, such as, for example, personal digital assistant (PDA) or cellular telephone 54A, desktop computer 54B, laptop computer 54C, and/or automobile computer system 54N may communicate. Nodes 122 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing devices 122 and cloud computing environment 50 can communicate with any type of computerized device over any type of network and/or network addressable connection (e.g., using a web browser).

FIG. 6 depicts a block diagram of functional layers of the cloud computing environment 50 of FIG. 5, in accordance with an embodiment of the disclosure. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and DevOps early risk identification 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method comprising:
executing, by a computer, a first version of a code module in a first test environment; collecting, by the computer, a first set of execution measurements, including code module execution times and code module control flows, for the first version of the code module executing in the first test environment;
creating, by the computer, a first profile of the first version of the code module based on the first set of execution measurements;
executing, by the computer, the first version of the code module in a second test environment;
collecting, by the computer, a second set of execution measurements, including code module execution times and control module control flows, for the first version of the code module executing in the second test environment;
creating, by the computer, a second profile of the first version of the code module based on the second set of execution measurements; and
in response to a difference between the first profile and the second profile providing, by the computer, diagnostic data characterizing the difference between the first profile and the second profile;
analyzing, by the computer, an impact of the difference between the first profile and the second profile on the execution of the code module, the impact comprising a value rating based on both of a number of other functions or other products dependent on the code module, and a frequency with which the code module is executed;
calculating, by the computer, a risk of code module failure value based on analyzing the impact of the difference between the first profile and the second profile;
providing, by the computer, a recommended action based on analyzing the impact of the difference and the calculated risk of code module failure value, based at least on a weighted value of an importance of an unstable function included in the first version of the code module based on a historical impact the unstable function has had on the first version of the code module and the number and criticality of the other functions and other products that depend on the unstable function, and deploying corrective code to fix the first version of the code module, using the recommended action.

2. The method according to claim 1, further comprising:
executing, by the computer, a second version of the code module in the first test environment, wherein the second version of the code module is the first version of the code module with one or more code changes;

collecting, by the computer, a third set of execution measurements, including code module execution times and code module control flows, for the second version of the code module executing in the first test environment;

creating, by the computer, a third profile of the second version of the code module based on the third set of execution measurements; and in response to a difference between the first profile and the third profile exceeding a threshold:
providing, by the computer, diagnostic data characterizing the difference between the first profile and the third profile;
analyzing, by the computer, the impact of the difference between the first profile and the third profile on the execution of the code module;
calculating, by the computer, a risk of code module failure value based on analyzing the impact of the difference between the first profile and the third profile; and
providing, by the computer, a recommended action based on analyzing the impact of the difference and the calculated risk of code module failure value.

3. The method according to claim 2, further comprising:
determining, by the computer, a set of code changes to the code module, based on the difference between profiles and the diagnostic data characterizing the difference between profiles.

4. The method according to claim 1, wherein the diagnostic data diagnostic characterizing the difference between profiles includes at least one of:
code functions characterized as problematic;
execution times characterized as changed;
function invocation counts characterized as changed;
executed functions characterized as new;
executed functions characterized as unexpected; and
an identification, identifying a developer of the code functions characterized as problematic.

5. The method according to claim 1, wherein the profile includes at least one of:
an aggregate of a number of times each function in the code module is invoked;
an aggregate execution time for each function in the code module;
an aggregate overall execution time for the code module;
an aggregate count of all function invocations in the code module;
a set of executed functions in the code module;
a set of unexecuted functions in the code module; and
an order of execution of the executed functions in the code module.

6. The method according to claim 1, wherein analyzing, by the computer, the impact of the difference between profiles includes analyzing at least one of:
a ratio of stable to unstable functions;

a count of changed functions;
an identity of an unstable function;
an historical impact value of the unstable function;
a change in execution time of a function; and
a weighted value of importance of the unstable function.

7. The method according to claim 1, wherein the code module failure risk value includes the risk of the executed code module experiencing at least one of:
a performance degradation;
a benchmark violation;
a code execution failure;
a code input/output failure;
an application failure; and
a system failure.

8. A computer program product, the computer program product comprising one or more computer readable storage medium and program instructions stored on at least one of the one or more computer readable storage medium, the program instructions comprising:
program instructions to execute, by a computer, a first version of a code module in a first test environment;
program instructions to collect, by the computer, a first set of execution measurements, including code module execution times and code module control flows, for the first version of the code module executing in the first test environment;
program instructions to create, by the computer, a first profile of the first version of the code module based on the first set of execution measurements;
program instruction to execute, by the computer, the first version of the code module in a second test environment;
program instructions to collect, by the computer, a second set of execution measurements, including code module execution times and control module control flows, for the first version of the code module executing in the second test environment;
program instructions to create, by the computer, a second profile of the first version of the code module based on the second set of execution measurements; and
in response to a difference between the first profile and the second profile exceeding a threshold:
program instructions to provide, by the computer, diagnostic data characterizing the difference between the first profile and the second profile;
program instructions to analyze, by the computer, an impact of the difference between the first profile and the second profile on the execution of the code module, the impact comprising a value rating based on both of a number of other functions and other products dependent on the code module, and a frequency with which the code module is executed;
program instructions to calculate, by the computer, a risk of code module failure value based analyzing the impact of the difference between the first profile and the second profile;
program instructions to provide, by the computer, a recommended action based on analyzing the impact of the difference and the calculated risk of code module failure value, based at least on a weighted value of an importance of an unstable function within the first version of the code module based on a historical impact the unstable function has had on the first version of the code module and the number and criticality of the other functions and other products that depend on the unstable function, and program instructions to deploy corrective code to fix the first version of the code module, using the recommended action.

9. The computer program product according to claim 8, further comprising:
program instructions to execute, by the computer, a second version of the code module in the first test environment, wherein the second version of the code module is the first version of the code module with one or more code changes;
program instructions to collect, by the computer, a third set of execution measurements, including code module execution times and code module control flows, for the second version of the code module executing in the first test environment;
program instructions to create, by the computer, a third profile of the second version of the code module based on the third set of execution measurements; and
in response to a difference between the first profile and the third profile exceeding a threshold:
program instructions to provide, by the computer, diagnostic data characterizing the difference between the first profile and the third profile;
program instructions to analyze, by the computer, the impact of the difference between the first profile and the third profile on the execution of the code module;
program instructions to calculate, by the computer, a risk of code module failure value based on analyzing the impact of the difference between the first profile and the third profile; and
program instructions to provide, by the computer, a recommended action based on analyzing the impact of the difference and the calculated risk of code module failure value.

10. The computer program product according to claim 9, further comprising:
program instructions to determine, by the computer, a set of code changes to the code module, based on the difference between profiles and the diagnostic data characterizing the difference between profiles.

11. The computer program product according to claim 8, wherein the diagnostic data diagnostic characterizing the difference between profiles includes at least one of:
code functions characterized as problematic;
execution times characterized as changed;
function invocation counts characterized as changed;
executed functions characterized as new;
executed functions characterized as unexpected; and
an identification, identifying a developer of the code functions characterized as problematic.

12. The computer program product according to claim 8, wherein the profile includes at least one of:
an aggregate of a number of times each function in the code module is invoked;
an aggregate execution time for each function in the code module;
an aggregate overall execution time for the code module;
an aggregate count of all function invocations in the code module;
a set of executed functions in the code module;
a set of unexecuted functions in the code module; and
an order of execution of the executed functions in the code module.

13. The computer program product according to claim 8, wherein program instructions to analyze, by the computer, the impact of the difference between profiles includes program instructions to analyze at least one of:
a ratio of stable to unstable functions;
a count of changed functions;
an identity of an unstable function;
an historical impact value of the unstable function;
a change in execution time of a function; and
a weighted value of importance of the unstable function.

14. The computer program product according to claim 8, wherein the code module failure risk value includes the risk of the executed code module experiencing at least one of:
a performance degradation;
a benchmark violation;
a code execution failure;
a code input/output failure;
an application failure; and
a system failure.

15. A computer system, the computer system comprising one or more processors, one or more computer readable memories, one or more computer readable tangible storage medium, and program instructions stored on at least one of the one or more storage medium for execution by at least one of the one or more processors via at least one of the one or more memories, the program instructions comprising:
program instructions to execute, by a computer, a first version of a code module in a first test environment;
program instructions to collect, by the computer, a first set of execution measurements, including code module execution times and code module control flows, for the first version of the code module executing in the first test environment;
program instructions to create, by the computer, a first profile of the first version of the code module based on the first set of execution measurements;
program instruction to execute, by the computer, the first version of the code module in a second test environment;
program instructions to collect, by the computer, a second set of execution measurements, including code module execution times and control module control flows, for the first version of the code module executing in the second test environment;
program instructions to create, by the computer, a second profile of the first version of the code module based on the second set of execution measurements; and
in response to a difference between the first profile and the second profile exceeding a threshold:
program instructions to provide, by the computer, diagnostic data characterizing the difference between the first profile and the second profile;
program instructions to analyze, by the computer, an impact of the difference between the first profile and the second profile on the execution of the code module, the impact comprising a value rating based on both of a number of other functions and other products dependent on the code module, and a frequency with which the code module is executed;
program instructions to calculate, by the computer, a risk of code module failure value based analyzing the impact of the difference between the first profile and the second profile;
program instructions to provide, by the computer, a recommended action based on analyzing the impact of the difference and the calculated risk of code module failure value, based at least on a weighted value of an importance of an unstable function within the first version of the code module based on a historical impact the unstable function has had on the first version of the code module and the number and criticality of the other functions and other products that depend on the unstable function, and program instructions to deploy corrective code to fix the first version of the code module, using the recommended action.

16. The computer system according to claim 15, further comprising:

program instructions to execute, by the computer, a second version of the code module in the first test environment, wherein the second version of the code module is the first version of the code module with one or more code changes;

program instructions to collect, by the computer, a third set of execution measurements, including code module execution times and code module control flows, for the second version of the code module executing in the first test environment;

program instructions to create, by the computer, a third profile of the second version of the code module based on the third set of execution measurements; and in response to a difference between the first profile and the third profile exceeding a threshold:

program instructions to provide, by the computer, diagnostic data characterizing the difference between the first profile and the third profile;

program instructions to analyze, by the computer, the impact of the difference between the first profile and the third profile on the execution of the code module;

program instructions to calculate, by the computer, a risk of code module failure value based on analyzing the impact of the difference between the first profile and the third profile; and program instructions to provide, by the computer, a recommended action based on analyzing the impact of the difference and the calculated risk of code module failure value.

17. The computer system according to claim 16, further comprising:

program instructions to determine, by the computer, a set of code changes to the code module, based on the difference between profiles and the diagnostic data characterizing the difference between profiles.

18. The computer system according to claim 15, wherein the diagnostic data diagnostic characterizing the difference between profiles includes at least one of:

code functions characterized as problematic;
execution times characterized as changed;
function invocation counts characterized as changed;
executed functions characterized as new;
executed functions characterized as unexpected; and
an identification, identifying a developer of the code functions characterized as problematic.

19. The computer system according to claim 15, wherein the profile includes at least one of:

an aggregate of a number of times each function in the code module is invoked;
an aggregate execution time for each function in the code module;
an aggregate overall execution time for the code module;
an aggregate count of all function invocations in the code module;
a set of executed functions in the code module;
a set of unexecuted functions in the code module; and
an order of execution of the executed functions in the code module.

20. The computer system according to claim 15, wherein program instructions to analyze, by the computer, the impact of the difference between profiles includes program instructions to analyze at least one of:

a ratio of stable to unstable functions;
a count of changed functions;
an identity of an unstable function;
an historical impact value of the unstable function;
a change in execution time of a function; and
a weighted value of importance of the unstable function.

* * * * *